Patented Mar. 27, 1928.

1,663,883

UNITED STATES PATENT OFFICE.

HEINRICH GÜNZLER AND OSKAR NEUBERT, OF ELBERFELD, NEAR COLOGNE, GERMANY, ASSIGNORS TO WINTHROP CHEMICAL COMPANY, INC., OF NEW YORK, N. Y.

DISINFECTING AND INSECTICIDAL AGENT.

No Drawing. Application filed March 31, 1927, Serial No. 180,058, and in Germany April 13, 1926.

Mercury salts which frequently have been used heretofore for disinfecting purposes exhibit certain disadvantageous qualities, for instance, they are difficultly soluble, particularly in neutral solutions; they are violent poisons and they have a rather strong irritating action.

The organic mercury compounds which have to some extent replaced the previously used mercury salts as disinfecting agents are in part at least free of the faults of the mercury salts, but the preparation of the organic mercury compounds is troublesome and expensive.

It has now been found that by simply mixing water-soluble salts of aromatic amino-sulfonic acids with water-soluble mercury salts and without having to isolate any particular organic mercury compound, there may be obtained products which possess a high disinfecting value and a relatively low poisoning and irritating action. The preparation of the products is extremely simple and easy from a technical standpoint.

The products are very stable and readily soluble in water. The solubility may be improved by the addition of table salt (sodium chloride) and other similar inert readily soluble materials which serve merely as diluents and solution promoting agents. The aqueous solutions of the products do not give any precipitate upon the addition of caustic soda.

Instead of the already prepared salts of the aromatic amino-sulfonic acids one may employ mixtures of the free acids with bases adapted to combine therewith to form the salts in chemically equivalent proportions or such mixtures containing the base in excess.

For certain purposes, for instance, for combating insects on plants, it is advantageous to add materials which improve the adherence and wetting properties of the compounds or compositions.

The invention is illustrated by the following examples:

*Example 1.*—20.5 parts by weight of the sodium salt of sulfanilic acid (95%) are mixed with 27.0 parts by weight of mercuric chloride.

*Example 2.*—28.0 parts by weight of the sodium salt of sulfanilic acid (95%) are mixed with 30.0 parts by weight of mercuric sulfate (95%) and 30.0 parts by weight of sodium chloride.

*Example 3.*—27.0 parts by weight of 2-amido-phenol-4.6-disulfonic acid are mixed with 11.0 parts by weight of calcined sodium carbonate and 27.0 parts by weight of mercuric chloride.

*Example 4.*—21.0 parts by weight of 2-anisidin-4-sulfonic acid are mixed with 12.0 parts by weight of calcined sodium carbonate, 32.0 parts by weight of mercuric acetate, 64.0 parts by weight of sodium bromide and 23.0 parts by weight of dextrin.

We claim:—

1. A composition comprising a water-soluble salt of an aromatic amino-sulfonic acid and a water-soluble mercury salt.

2. A composition comprising an aromatic amino-sulfonic acid, a base capable of reacting with said acid to the formation of a water-soluble salt and a water-soluble mercury salt.

3. A composition comprising a water-soluble aromatic amino-sulfonic acid compound and a water-soluble mercury salt.

4. A composition comprising a water-soluble aromatic amino-sulfonic acid compound, a water-soluble mercury salt and an inert wetting material miscible with water.

5. A composition comprising a water-soluble aromatic amino-sulfonic acid compound, a water-soluble mercury salt and an adhesion promoting material miscible with water.

6. A composition comprising a water-soluble aromatic amino-sulfonic acid compound, a water-soluble mercury salt, an inert wetting material and an adhesion promoting material miscible with water.

7. As a disinfecting composition comprising the sodium salt of sulfanilic acid and mercuric chloride.

In testimony whereof, we affix our signatures.

HEINRICH GÜNZLER.
OSKAR NEUBERT.